A. SOMMERMEYER.
APPARATUS FOR THE TREATMENT OF CARCASSES, SLAUGHTER HOUSE WASTE, AND THE LIKE.
APPLICATION FILED JULY 6, 1911.
1,046,402.
Patented Dec. 3, 1912.
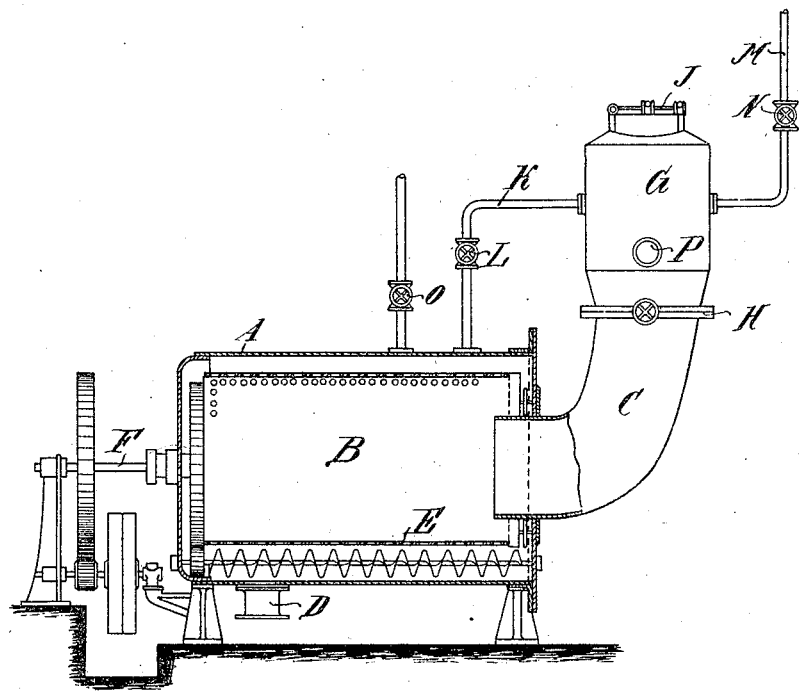

UNITED STATES PATENT OFFICE.

AUGUST SOMMERMEYER, OF BERLIN, GERMANY, ASSIGNOR TO THE FIRM OF RUDOLF A. HARTMANN, MASCHINENFABRIK, OF BERLIN, GERMANY.

APPARATUS FOR THE TREATMENT OF CARCASSES, SLAUGHTER-HOUSE WASTE, AND THE LIKE.

1,046,402.

Specification of Letters Patent.

Patented Dec. 3, 1912.

Application filed July 6, 1911. Serial No. 637,228.

*To all whom it may concern:*

Be it known that I, AUGUST SOMMERMEYER, a subject of the King of Prussia, and resident of 65 Gitschinerstrasse, Berlin, in the German Empire, having invented a new and useful Apparatus for the Treatment of Carcasses, Slaughter-House Waste, and the Like, of which the following is a specification.

This invention relates to an improved apparatus for the treatment of carcasses, slaughter-house waste and the like and has for its object to obtain meat meal, fat, glue and other constituents therefrom, and the invention relates to the type of apparatus in which the material is subjected to the action of saturated steam under pressure, or to the vapors of non-fatty substances such as benzin, carbon tetrachlorid, carbon-bisulfid or the like, the fat and gelatinous constituents being extracted thereby. The residue which remains and which is more or less freed from fatty and gelatinous constituents, is then dried and results in a residue in the form of a brown powder, the fatty and gelatinous constituents being obtained as by-products and separating therefrom, in the form of a liquid.

Hitherto it has been usual to carry out the extracting and drying processes in succession in the same apparatus so that it is necessary to complete the treatment of the charge in the apparatus and to discharge the same before a fresh charge may be treated therein. In order to accelerate the process, it has therefore been proposed to carry out the extracting and drying processes in separate apparatus so that the material after being treated with an extracting medium in the one apparatus, may be transferred to the drying apparatus and the extracting apparatus thereupon filled with a new charge. This process however is also too slow for application in cases where large quantities of the material are to be dealt with, as the charge in the extracting apparatus must be fully dried and discharged therefrom before further material may be admitted to the extracting apparatus. These processes necessitate the erection of large plants where considerable quantities of the material are to be dealt with, thus considerably raising the cost while at the same time occupying considerable space.

In order that the foregoing deficiencies may be obviated, I provide means whereby the process may be carried on continuously, fresh material being supplied to the extracting apparatus as the process proceeds and as the extracted constituents are discharged therefrom without relieving the pressure in the extracting apparatus.

My invention also comprises means whereby the material under treatment is finely divided in the extracting apparatus by subjecting the same to an agitatory or rotary movement, the material in this finely divided state being then drawn off from the extracting apparatus.

By this means it is possible to treat large quantities of the material in the same apparatus, the treatment being carried out continuously and fresh material being fed thereto as the process proceeds.

In order that the invention may be more clearly understood reference is made to the accompanying drawing wherein is shown by way of example the preferred construction of apparatus for carrying out the invention.

Referring to the drawing: the extracting apparatus comprises a horizontal vessel A within which is rotatably mounted a cylindrical or conically formed perforated drum B, the latter being driven by means of suitable gearing F from a counter shaft. Opening into the end of the drum B is a feed-conduit C by way of which the material is fed to the interior of the drum B, said conduit C being of comparatively large diameter. The vessel A is provided at its lower end with an outlet D which is also of comparatively large diameter, said outlet D communicating with the drying apparatus or other vessel in which the material is to be subjected to further treatment. Intermediate the drum B and the lower part of the vessel A is a conveyer E preferably of the screw type, said conveyer being rotated by suitable gearing from the gearing F and feeding the extracted and finely divided material as well as the liquid constituents to the outlet D.

The drum B is set in continuous rotary motion by means of the driving gear F during the process of extracting, the material in the drum being in this manner agitated and finely divided therein until the finely divided material falls through the perforations in the drum B after which it is discharged by the conveyer E. Steam or other extracting medium is supplied to the interior of the vessel A by means of a valved pipe O.

As the material in the vessel A is subjected to treatment under pressure it is necessary to provide special means for feeding the material to the drum B and for this purpose a feeding receptacle G is connected to the conduit C, communication between the receptacle G and conduit C being capable of regulation by means of a slide valve H. The feeding receptacle G is preferably of such capacity as to be capable of containing as much material therein as may be subjected to treatment in the vessel A within a predetermined period. The receptacle G is provided at its upper end with a cover J capable of being tightly closed and the interior of the receptacle G, communicates with the interior of the vessel A by way of a pipe K having a valve L, so that when the valve L is opened, pressure may be generated in the receptacle G to equalize the pressure in the vessel A whereupon material may be fed to the drum B. The receptacle G is also provided with a pipe M opening into the atmosphere and which may be controlled by means of a valve N.

The method of carrying out the process is as follows: The drum B is filled by opening the valve H and supplying material by way of the cover G. When the drum B has been filled to the desired extent the valve H is closed and the extracting process carried out by admitting a suitable extracting medium by way of the valved pipe O. The constituents of the material in the drum B are thus extracted and after a certain length of time, a further charge may be supplied to the drum B. For this purpose the receptacle G is filled anew with the material and the cover G tightly closed, whereupon the valve L is opened and the pressure in the vessel A and receptacle G thus equalized, so that upon opening the valve H the contents of the receptacle G fall into the drum B. When the container is empty, which may be observed by way of a sight-glass P, the valves H and L may be closed and the valve N opened, so as to reduce the pressure in the receptacle G. The cover J can then be opened and the filling operation repeated as often as required according to the material treated in the drum B.

It will of course be readily understood that the apparatus hereinbefore described and shown on the accompanying drawing may be readily varied according to the requirements without departing from the principle of the invention.

I claim:—

1. Apparatus for the treatment of carcasses, slaughter-house waste and the like, comprising a closed vessel to which an extracting medium is supplied under pressure, a rotatably mounted perforated drum in said vessel, means for rotating said drum, a conduit for feeding the material to be treated to the interior of said drum, an outlet in said vessel for discharging the extracted constituents and means for intermittently supplying fresh material through said conduit to said drum during the treatment of the material therein and without relieving the pressure existing in said closed vessel so as to replace the discharged constituents comprising a feed hopper connected to said conduit, a cover over said hopper, a valve controlling communication between said hopper and conduit and means for intermittently establishing connection between said vessel and the upper interior part of said hopper so as to intermittently equalize the pressure in said hopper and vessel.

2. Apparatus for the treatment of carcasses, slaughter-house waste and the like, comprising a closed vessel to which an extracting medium is supplied under pressure, a rotatably mounted perforated drum in said vessel, means for rotating said drum, a conduit for feeding the material to be treated to the interior of said drum, an outlet in said vessel for discharging the extracted constituents and means for intermittently supplying fresh material through said conduit to said drum during the treatment of the material therein and without relieving the pressure existing in said closed vessel so as to replace the discharged constituents comprising a feed hopper connected to said conduit, a cover over said hopper, a valve intermediate said hopper and drum, a pipe connecting said vessel with the upper interior part of said hopper and a valve in said pipe for enabling the pressure in said hopper and vessel to be intermittently equalized.

3. Apparatus for the treatment of carcasses, slaughter-house waste and the like, comprising a closed vessel to which an extracting medium is supplied under pressure, a rotatably mounted perforated drum in said vessel, means for rotating said drum, a conduit for feeding the material to be treated to the interior of said drum, an outlet in said vessel for discharging the extracted constituents and means for intermittently supplying fresh material through said conduit to said drum during the treatment of the material therein and without relieving the pressure existing in said closed vessel so as to replace the discharged constituents comprising a feed hopper connected to said conduit, a cover over said hopper, a valve controlling communication between said hopper and conduit, means for intermittently establishing connection between said vessel and the upper interior part of said hopper so as to intermittently equalize the pressure in said hopper and vessel and a valve-controlled pipe leading from said hopper to the atmosphere.

In witness whereof I have hereunto set my hand in the presence of two witnesses.

AUGUST SOMMERMEYER.

Witnesses:
  HENRY HASPER,
  WOLDEMAR HAUPT.